UNITED STATES PATENT OFFICE.

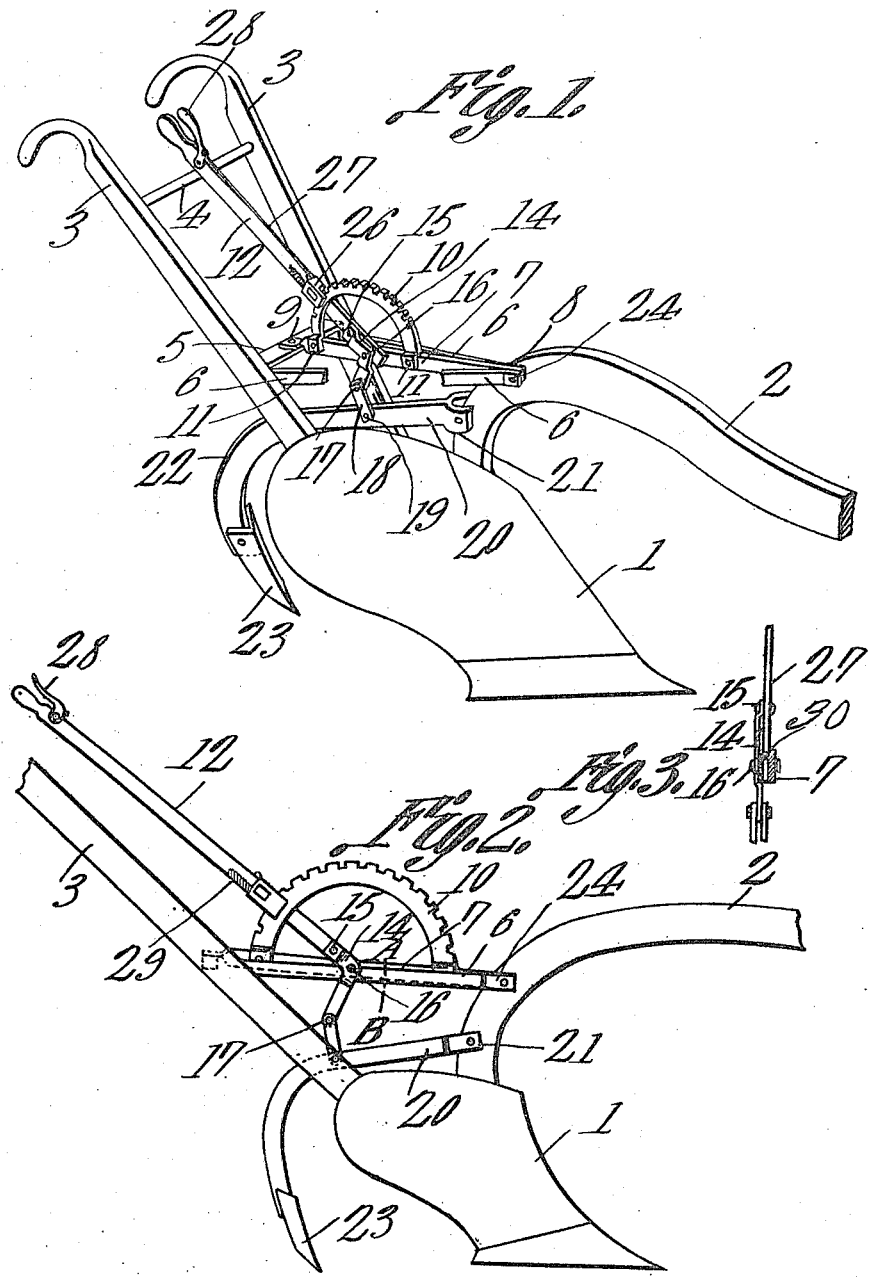

WILLIAM I. PRATER, OF JASPER, GEORGIA.

ADJUSTABLE SUBSOIL ATTACHMENT.

1,028,274.　　　　Specification of Letters Patent.　　Patented June 4, 1912.

Application filed June 24, 1911. Serial No. 635,210.

*To all whom it may concern:*

Be it known that I, WILLIAM I. PRATER, a citizen of the United States, residing at Jasper, in the county of Pickens and State of Georgia, have invented a new and useful Adjustable Subsoil Attachment, of which the following is a specification.

It is the object of the present invention to provide a sub-soil attachment for a plow, equipped with novel means for adjusting the sub-soil attachment, and for maintaining the same in predetermined positions.

A further object of the invention is to provide a sub-soil attachment, the mountings of which will enter into the construction of the plow, to increase the strength of the same.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective; Fig. 2 is a side elevation, parts being broken away; and Fig. 3 is a fragmental section on the line A—B of Fig. 2.

In the drawings, the numeral 1 denotes the moldboard of the plow, to which the plow beam 2 and the handles 3 are secured, the handles 3 being braced as usual, as shown at 4. Below the brace 4, the handles 3 are united by a cross brace 5, and converging braces 6 unite the handles 3 with the plow beam 2. Located between the converging braces 6, is a rearwardly extended supporting bar 7, the forward end of which is connected, as shown at 8, together with the converging braces 6, to the plow beam 2, the rear end of the supporting bar 7 being secured, as shown at 9, to the intermediate portion of the cross brace 5. Fixed to and rising from the supporting bar 7, is a segment 10, the ends of which are secured to the supporting bar 7, as shown at 11.

The invention further includes a rearwardly extended operating lever 12, to the lower, forward end of which is secured an angle member 14, as shown at 15, a pivot pin 16 being extended through the angle member 14, through the lever 12, through a washer 30 interposed between the angle member 14 and the lower end of the operating lever 12, and through the supporting bar 7, the pivot pin 16 obviously constituting a fulcrum for the lever 12, the lower end of the angle member 14 extending downwardly, approximately at right angles to the lever 12. The angle member 14 at its apex is off-set from the lever 12 to provide for the insertion of the washer 30. The lever 12 and the angle member furnish a double walled fulcrum and the washer prevents a lateral bending of the angle member.

Through the lower end of the depending portion of the angle member 14, a pivot pin 17 is extended, the same serving as a mounting for the upper ends of a pair of links 18, disposed upon both sides of the depending portion of the angle member 14. Through the lower ends of the links 18, a pivot pin 19 is extended, the pivot pin 19 passing through the intermediate portion of the sub-soil beam 20, the sub-soil beam being located between the links 18. The sub-soil beam 20 is bifurcated at its forward end, as shown at 24, to span the plow beam 1, and through the bifurcated portion 24 of the sub-soil beam, and through the plow beam 2, is passed a pivot element 21, constituting a fulcrum for the sub-soil beam. The sub-soil beam is rearwardly and downwardly curved as shown at 22, and carries the sub-soil blade 23, which may be of any desired construction.

The lever 12 carries a latch 26, controlled by a rod 27, connected with a hand lever 28, fulcrumed upon the operating lever 12, adjacent the upper end of the operating lever. The latch 26 is actuated by a compression spring 29, to engage with the segment 10. As will be readily understood, the lever 28 may be manipulated to free the latch 26 from the segment 10, whereupon the operating lever 12 may be swung upon its pivotal mounting 16, the angle member 14, through the instrumentality of the links 18, serving to elevate and to lower the sub-soil beam 20, together with the sub-soil blade 23. The sub-soil blade 23 may be held at adjusted position, through the engagement between the latch 26, the segment 10, and diverging braces connected at their forward ends with the beam and with the supporting bar, and at their rear ends connected with the handles.

The members 12 and 14 constitute a bell crank, the upper end of which lies between the handles 3, within easy reach of the operator, so that the sub-soil blade 23 may readily be raised and lowered, the member 12 and the hand lever 28 being located in an accessible position. Owing to the fact that the angle member 14 is applied to the lower, forward end of the operating lever 12, the lever is reinforced at its fulcrum point, and wear upon the operating member, due to its pivotal movement, is reduced to a minimum. Moreover, the angle member 14 and the washer 30, serve to strengthen the operating member, adjacent its fulcrum, and to enable the operating member to withstand the strain imposed upon it both by the dragging action of the sub-soil blade 23, and by the manipulation of the operating lever 12 to adjust the sub-soil blade.

The supporting bar 7 serves not only as a means for upholding the sub-soil beam 20, but, at the same time, serves as a connecting element between the plow beam 2 and the cross brace 5, thus serving to strengthen the mounting of the handles 3.

It is to be noted that the device herein disclosed is primarily an attachment for a plow of standard construction, the device comprising a tri-angular frame formed by the members 5 and 6, the frame being strengthened by the bar 7, the frame being adapted, at once, to serve as a brace between the plow handles 3 and the plow beam 2, and to serve as a place of attachment for the movable sub-soiling means.

Having thus described the invention, what is claimed is:—

As an article of manufacture, a sub-soiling attachment for a plow, comprising a triangular frame adapted to serve at once as a brace between the plow beam and the handles of the plow and as a support for movable sub-soiling means, the frame comprising a cross brace adapted for terminal connection with the plow handles, a supporting bar projecting from the intermediate portion of the cross brace and braces converging from the ends of the cross brace into union with the supporting bar, the united ends of the bar and of the converging braces being adapted for connection with the plow beam; a segment secured to the supporting bar; a bell crank lever fulcrumed at its angle upon the supporting bar and including upper and lower arms both of which extend rearwardly; latch mechanism carried by the upper arm for engagement with the segment; a sub-soil beam located below the supporting bar and having means at its forward end for connection with a plow beam, the rear end of the sub-soil beam being downwardly and rearwardly extended; a sub-soil share attached to the rear end of the sub-soil beam; and a link pivotally connected with the intermediate portion of the sub-soil beam and with the lower arm of the lever.

In testimony that I claim the foregoing as my own, I have hereto affixed my signature in the presence of two witnesses.

WILLIAM I. PRATER.

Witnesses:
 Jno. S. Wood,
 A. C. Cagle.

Copies of this patent may be obtained for five cents each, by addressing the "Commissioner of Patents, Washington, D. C."